US012798141B2

(12) United States Patent
Rottmar

(10) Patent No.: US 12,798,141 B2
(45) Date of Patent: Nov. 17, 2026

(54) SLICING MACHINE AND METHOD FOR OPERATING A SLICING MACHINE

(71) Applicant: MULTIVAC SEPP HAGGENMÜLLER SE & CO. KG, Wolfertschwenden (DE)

(72) Inventor: Matthias Rottmar, Kronburg (DE)

(73) Assignee: Multivac Sepp Haggenmüller Se & Co. KG, Wolfertschwenden (DE)

( * ) Notice: Subject to any disclaimer, the term of this patent is extended or adjusted under 35 U.S.C. 154(b) by 105 days.

(21) Appl. No.: 18/673,580

(22) Filed: May 24, 2024

(65) Prior Publication Data

US 2025/0001637 A1 Jan. 2, 2025

(30) Foreign Application Priority Data

May 24, 2023 (DE) ........................ 102023113600.3

(51) Int. Cl.
*B26D 7/06* (2006.01)
*B26D 7/32* (2006.01)

(52) U.S. Cl.
CPC ......... *B26D 7/0633* (2013.01); *B26D 7/0683* (2013.01); *B26D 7/32* (2013.01); *B26D 2210/02* (2013.01)

(58) Field of Classification Search
CPC ...... B26D 7/0633; B26D 7/0683; B26D 7/32; B26D 2210/02; F16B 2/12; Y10T 403/60; Y10T 403/602
See application file for complete search history.

(56) References Cited

U.S. PATENT DOCUMENTS

| | | | | |
|---|---|---|---|---|
| 11,945,132 B2 * | 4/2024 | Stachel | .................... | B26D 7/01 |
| 2007/0214969 A1 * | 9/2007 | Mueller | .................. | B26D 7/01 99/485 |

(Continued)

FOREIGN PATENT DOCUMENTS

| | | | |
|---|---|---|---|
| DE | 102010019248 A1 * | 11/2011 | .......... B26D 7/0608 |
| DE | 102011083498 A1 * | 3/2013 | ............ A22C 17/02 |

(Continued)

OTHER PUBLICATIONS

English language translation of WO 00/59689 to Toda et al. (Year: 2000).*

(Continued)

*Primary Examiner* — Evan H Macfarlane
(74) *Attorney, Agent, or Firm* — Brooks Kushman P.C.

(57) ABSTRACT

A slicing machine for slicing product calibers lying parallel in different tracks into slices, and for creating portions from the slices, may comprise a cutting unit for separating the slices from the product calibers, and a feeding unit for feeding the product calibers to the cutting unit. The feeding unit may comprise a gripper unit with one gripper per track, a gripper carriage which carries the grippers, and a carriage guide along which the gripper carriage can be moved in a controlled manner in a feed direction. Each gripper is assigned an adjustment unit, by means of which the particular gripper can be moved in an actively controlled manner by a predetermined travel path relative to the gripper carriage in and/or against the feed direction. A method for operating a multi-track slicing machine is also disclosed.

17 Claims, 11 Drawing Sheets

(56) References Cited

U.S. PATENT DOCUMENTS

| | | | | |
|---|---|---|---|---|
| 2011/0265624 | A1* | 11/2011 | Pasek | B26D 7/32 83/409 |
| 2012/0042757 | A1* | 2/2012 | Weber | B26D 7/325 83/78 |
| 2012/0104211 | A1* | 5/2012 | Saijo | F16M 11/041 248/316.4 |
| 2012/0312135 | A1* | 12/2012 | Schaub | B26D 7/0608 83/72 |
| 2013/0160620 | A1* | 6/2013 | Reifenhaeuser | B26D 7/02 83/13 |
| 2017/0259448 | A1* | 9/2017 | Weber | B26D 7/30 |

FOREIGN PATENT DOCUMENTS

| | | | | |
|---|---|---|---|---|
| DE | 102014106353 | A1 * | 11/2015 | B26D 7/0683 |
| WO | WO-0059689 | A1 * | 10/2000 | B26D 7/0683 |

OTHER PUBLICATIONS

English language translation of DE 10 2010 019 248 A1 to Schmeiser (Year: 2011).*

English language translation of DE 10 2014 106 353 A1 to Muller (Year: 2015).*

English language translation of DE 10 2011 083 498 A1 to Reifenhaeuser (Year: 2013).*

* cited by examiner

SLICING MACHINE AND METHOD FOR OPERATING A SLICING MACHINE

CROSS-REFERENCE TO RELATED APPLICATIONS

This application claims priority to German Patent Application No. DE 102023113600.3 filed on May 24, 2023, the disclosure of which is incorporated in its entirety by reference herein.

TECHNICAL FIELD

The invention relates to slicing machines, in particular "slicers," with which strands of an only slightly compressible product such as sausage or cheese are sliced in the food industry. The invention further relates to a method for operating such a slicing machine.

BACKGROUND

Since these strands can be produced with a cross-section that retains its shape and dimensions well over its length, i.e. is substantially constant, they are called product calibers.

In most cases, several product calibers arranged in parallel with one another on individual tracks are cut open at the same time by the same blade, which moves in a transverse direction to the longitudinal direction of the product calibers, cutting off one slice at a time in one pass.

The product calibers are pushed forwards by a feed conveyor of a feeding unit in the direction of the blade of the cutting unit, usually on an inclined downward feed conveyor, and are each fed through the product openings of a plate-shaped, so called cutting frame, at the front end of which the projecting part of the product caliber is cut off as a slice by the blade immediately in front of the cutting frame.

During slicing, the product calibers are usually held at their rear end facing away from the cutting frame by a gripper, which is equipped with corresponding gripper claws to prevent uncontrolled downwards movement of the product calibers.

The slicing machines often have a multi-track design, which means that the feeding unit holds a plurality of adjacent product logs, each held at the rear end by a gripper, and feeds them to the cutting unit, which cuts off a slice from each of the product logs, virtually simultaneously, with a single working stroke of the single blade.

The grippers are, as a rule, all attached to a gripper carriage running transversely to the feed direction and can be moved in the feed direction, which is why the grippers can substantially only be moved synchronously. In order to compensate for the smallest production inaccuracies of the product calibers in terms of length, the grippers usually have a passive compensation mechanism, for example acting by means of spring force, but this only allows the grippers to be moved a very small distance relative to each other in the feed direction. This solution is therefore not suitable for the simultaneous slicing of product calibers which have a significant difference in length, for example of more than 50 mm.

Although it is known to arrange the grippers on several different gripper guides and/or gripper carriages in order to solve this problem, this however requires much design effort with regard to the feeding unit, and usually also has a negative effect on the accessibility of the slicing machine in the region of the feed unit for a user, in particular if the several gripper guides and/or gripper carriages are arranged on opposite sides of the slicing machine.

SUMMARY

It is therefore the object according to the invention to provide a slicing machine, in particular a slicer, which can remedy this situation, in particular by means of a solution by means of which—with reasonable design effort and still good accessibility of the slicing machine-product calibers of different lengths can be sliced together.

It is further an object of the invention to provide a corresponding method for operating a slicing machine.

This object is achieved by the features of independent claims of the application. Advantageous embodiments result from the subclaims.

A generic multi-track slicing machine, such as a slicer, for slicing product calibers lying parallel, in particular next to each other, in different tracks into slices, and for creating portions from the slices typically comprises:

- a cutting unit with a blade, which is movable, in particular rotatable, in a cutting plane for separating the slices from the product calibers,
- a feeding unit with a feed conveyor for feeding the product calibers to the cutting unit along a feed direction and a gripper unit with
- one gripper per track,
- a gripper carriage which carries the grippers, and
- a carriage guide along which the gripper carriage can be moved in a controlled manner in the feed direction, and
- a controller for controlling moving parts of the slicing machine.

According to the invention, each gripper is assigned an adjustment unit, by means of which the gripper can be moved in an actively controlled manner by a predetermined travel path relative to the gripper carriage in and/or against the feed direction.

With the solution according to the invention, different lengths of the product calibers to be simultaneously sliced can be compensated by means of the adjustment unit of each gripper, while the grippers are still arranged on a, preferably single and/or common, gripper carriage, so that good accessibility and thus a high level of user-friendliness of the slicing machine can be achieved along with a reasonable design effort.

The term "actively controlled" is to be interpreted in the scope of the present application in such a way that the method, i.e. the movement, of the grippers by the predetermined travel path relative to the gripper carriage is carried out by actively controlling the adjustment unit, i.e. for example by controlling the particular adjustment unit by means of the controller of the slicing machine, which for this purpose can have a corresponding signal connection with the adjustment units and/or a part connected thereto, in particular a drive unit of the adjustment unit.

Preferably, the grippers can be moved in an actively controlled manner by means of the particular adjustment unit only in the feed direction by the predetermined travel path relative to the gripper carriage. Consequently, the grippers can, for example, be moved in an actively controlled manner into their extended position only in the direction of the product caliber. From the extended position, however, the grippers can be moved back into their retracted position by moving or pressing the gripper against a particular product caliber.

Preferably, the magnitude of the predetermined travel path is set in such a way that it approximately corresponds to the expected length differences of the product calibers to be sliced. Preferably, the predetermined travel path can be at least 50 mm, preferably at least 100 mm, particularly preferably at least 150 mm.

After loading the product calibers to be sliced onto the feed conveyor of the slicing machine, the grippers can initially be moved together in the direction of the product calibers by means of the gripper carriage until the gripper on the track on which the longest product caliber is located reaches an end of this product caliber facing away from the cutting unit. Subsequently, the other grippers can each be moved by a maximum of the predetermined travel path in the direction of the particular product caliber by means of the corresponding adjustment unit, so that each gripper can grip a rear end of the product caliber on its track. In principle, the grippers could be moved to a desired end position by manually controlling the adjustment units, for example by an operator of the slicing machine.

Preferably, however, the grippers can be moved automatically by means of the predetermined travel path relative to the gripper carriage in a force-controlled manner by means of the adjustment unit. With force control, the grippers can be moved until the force acting on the gripper or the adjustment unit exceeds a predetermined threshold value. The force can be monitored, for example, by a corresponding sensor on the adjustment unit, which is connected to the controller of the slicing machine. If the adjustment unit comprises, for example, an electric drive unit, alternatively only a motor current and/or motor torque of the electric drive unit can be evaluated by means of the controller in order to determine whether or not the particular gripper has reached the product caliber assigned thereto. The exceeding of the threshold value can be defined by the controller of the slicing machine in such a way that the particular gripper was moved up to the product caliber assigned thereto. If the drive units are designed as pneumatic drive units, a pressure prevailing in a pneumatic cylinder of the particular drive unit and/or a path, i.e. a position, of the pneumatic cylinder can alternatively be monitored by means of the controller that the particular gripper was moved up to the product caliber assigned thereto.

Additionally or alternatively, the grippers can however also be moved in a position-controlled manner by means of the adjustment unit. In this case, for example, a distance between the gripper and the product caliber assigned thereto can also be determined using a sensor, for example an optical sensor such as a laser or a camera or the like, on the gripper and/or the adjustment unit, and the gripper can be accordingly moved in the direction of the product caliber by means of the adjustment unit until the distance is only so small that the gripper can grip the product caliber. Alternatively, the sensor can also be designed as a touch sensor or the like which is triggered when the particular gripper reaches the particular product caliber.

However, it is also possible to first extend the grippers completely by the predetermined travel path in the feed direction by means of the adjustment units, and only afterward move the grippers together in the direction of the product calibers by means of the gripper carriage so that the grippers are each moved back by a predetermined amount of the predetermined travel path against the feed direction by approaching or pressing the gripper against the particular product caliber depending on the length differences of the product calibers to be simultaneously sliced, until each gripper can grip a product caliber located on its track.

In order to be able to best compensate for a difference in length of the product calibers on each track, each gripper can preferably be moved independently of the other grippers by the predetermined travel path relative to the gripper carriage in the feed direction in an actively controlled manner. This also ensures that preferably only those adjustment units that also have to perform length compensation are controlled, i.e. moved, and, for example, the adjustment unit of a gripper on a track on which there is currently no product caliber is not also controlled.

Since the length compensation usually only has to be carried out in or against the feed direction, it is generally sufficient if the adjustment units can only be moved in a linear direction. According to a preferred embodiment, the adjustment unit can therefore comprise a linear unit, by means of which the particular gripper can be moved in a linear direction by the travel path. The linear direction can correspond to the feed direction. The linear unit can preferably comprise a linear guide in order to ensure precise positional adjustment and a compact, i.e. space-saving arrangement of the adjustment unit.

To ensure the most precise adjustment possible, the, preferably each, adjustment unit can comprise a drive unit which can be designed as a motorized, preferably servomotor, drive unit. This can be particularly advantageous for position-controlled actuation of the adjustment units.

Alternatively, the drive unit can also be designed as a pneumatic drive unit, which in turn is particularly well-suited in connection with a force-controlled method or movement of the adjustment units. If namely, for example, one or more adjustment units are subjected to a predetermined actuation pressure, they are preferably each moved automatically until they have reached the product caliber assigned to them, i.e. on the same track.

In order to also ensure a compact and easily accessible arrangement of the drive unit in this context, the drive unit can be arranged on the side of the adjustment unit facing away from the cutting unit.

Additionally or alternatively, the drive unit can comprise a drive element, in particular a pressure rod, which is coupled to the linear unit in a manner that transmits in particular only pressure forces, but preferably no tensile forces. As a result of this, each linear unit can be extended by means of the drive element, in particular the pressure rod, using a pressure force.

Finally, since very easy maintenance of the slicing machine according to the invention is also to be ensured, the adjustment unit, in particular the linear unit and/or the drive unit, can preferably be mounted on the gripper carriage and/or removed from the gripper carriage without tools. As a result of this, downtimes of the slicing machine can be kept as short as possible, and the adjustment units can be quickly removed or installed and exchanged between different tracks of the slicing machine.

In a further development of this embodiment, the adjustment unit can therefore preferably further comprise a locking system which has a first locking means, in particular a pawl, formed on the adjustment unit, in particular on the linear unit and/or the drive unit, which is designed to engage in its locked position with a second locking means, in particular a projection, arranged on the gripper carriage. Preferably, the first locking means is pre-tensioned into its locked position, in particular by means of a spring. The first locking means therefore only has to be opened against the pre-tensioning force when unlocking, for example manually, i.e. it has to be transferred into its unlocked position in order to be able to remove the adjustment unit, in particular the linear unit and/or the drive unit, from the gripper carriage.

Additionally or alternatively, the locking system can further comprise at least one hook projection by means of which the adjustment unit, in particular the linear unit and/or the drive unit, can be attached to the gripper carriage so as to be pivotable about a pivot axis, wherein, in its locked position, the first locking means is preferably designed to prevent a pivoting movement of the adjustment unit, in particular the linear unit and/or the drive unit, about the pivot axis. Consequently, the adjustment unit, in particular the linear unit and/or the drive unit, can preferably first be pivotably attached to the gripper carriage by means of the particular hook projection and then pivoted by means of a pivoting movement about the pivot axis such that the first locking means formed thereon, in particular the pawl, can engage with or latch onto the second locking means arranged on the gripper carriage, in particular the projection.

In particular, the first locking means formed on the linear unit and/or the hook projection on the linear unit can be substantially identical to the first locking means formed on the drive unit and/or to the hook projection on the drive unit, which enables an even faster change of the components, since handling is particularly simplified.

In order to be able to also meet the particularly high requirements with respect to hygiene in the food industry, the adjustment unit, in particular the linear unit, can at least partially have a profile cross section that is open at least on one side, in particular upwards, i.e. substantially in the height direction of the product caliber, and/or can be designed substantially without undercuts. In other words, the design of the adjustment unit can be chosen in such a way that it is particularly easy to access for cleaning. By avoiding undercuts, hollow spaces or enclosed spaces can be avoided, which may be difficult to access during cleaning. The adjustment unit is also preferably designed to be flushable so that a cleaning agent, such as a cleaning fluid, applied to the adjustment unit can drain off again by itself.

A method according to the invention for operating a multi-track slicing machine, in particular according to the invention, in particular slicers, comprises the following steps:

- feeding at least two product calibers on different tracks parallel along a feed direction, in particular by means of a feed conveyor of a feeding unit,
- cutting off slices from the front ends of the product calibers, in particular by means of a cutting unit,
- storing the slices, in particular on a portioning belt, to create portions consisting of one or more slices,
- wherein the product calibers are each held by a gripper of a gripper unit at their rear end, in particular the end used by the cutting unit, during feeding, and
- before feeding the product calibers, in particular to the cutting unit, each gripper is moved in an actively controlled manner by a predetermined travel path relative to a, in particular common, gripper carriage of the gripper unit in and/or against the feed direction, in particular so that each gripper can grip a rear end of the product caliber assigned thereto.

It should already be indicated at this point that all statements, advantages and effects described for the slicing machine according to the invention also apply to the method according to the invention and vice versa.

The predetermined travel path can preferably be at least 50 mm, preferably at least 100 mm, particularly preferably at least 150 mm.

As already mentioned at the beginning, each gripper can also be moved in a force-controlled and/or position-controlled manner by the predetermined travel path relative to the gripper carriage.

Additionally or alternatively, each gripper can be moved in an actively controlled manner independently of the other grippers by the predetermined travel path relative to the gripper carriage in and/or against the feed direction.

BRIEF DESCRIPTION OF THE DRAWINGS

Embodiments in accordance with the invention are described in more detail below by way of example. In the drawings.

DETAILED DESCRIPTION

Figure 1A:
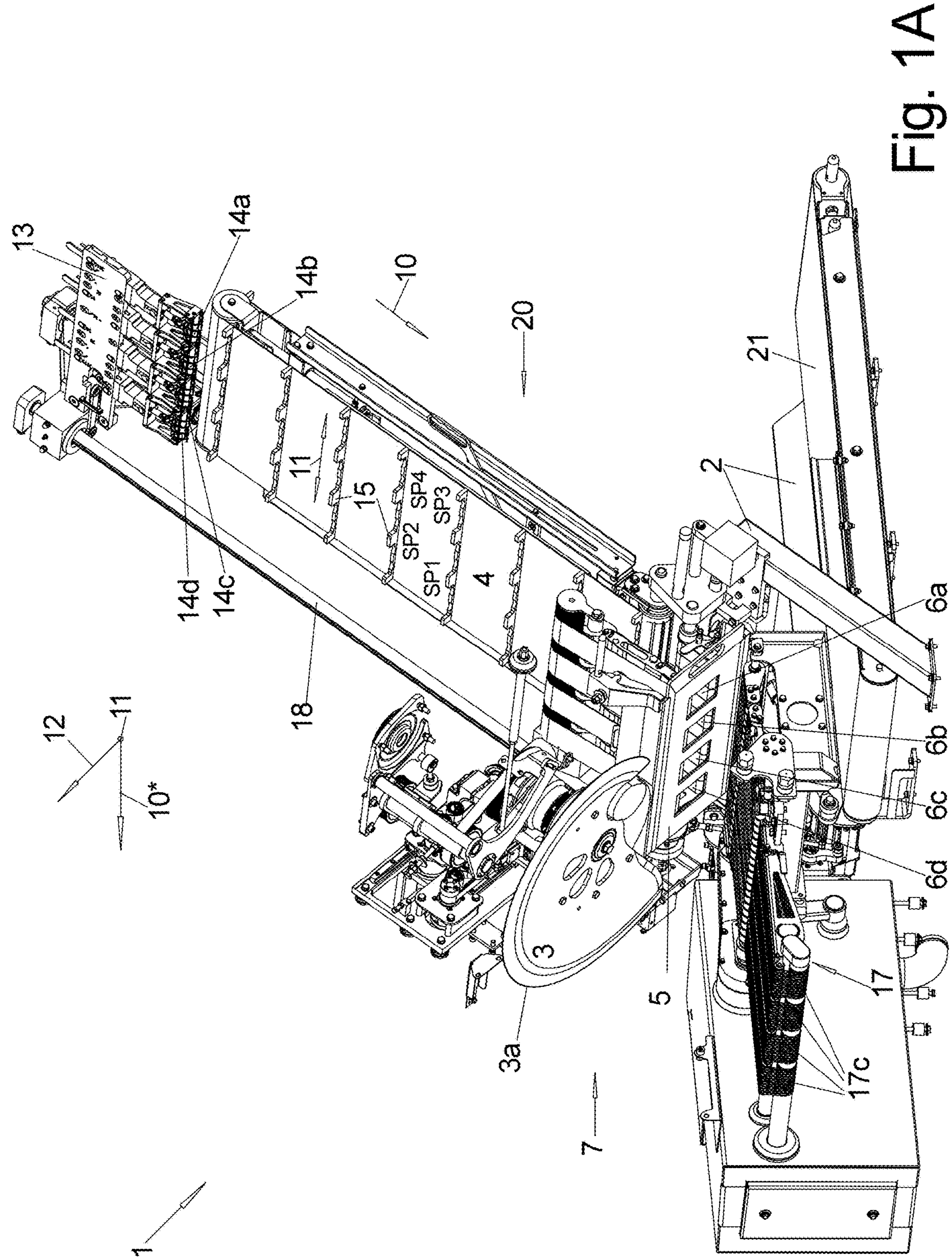
FIGS. 1A, B show a known slicing machine in the form of a slicer according to the prior art in different perspective views, with the feed belt folded up into the slicing position.
Figure 1B:
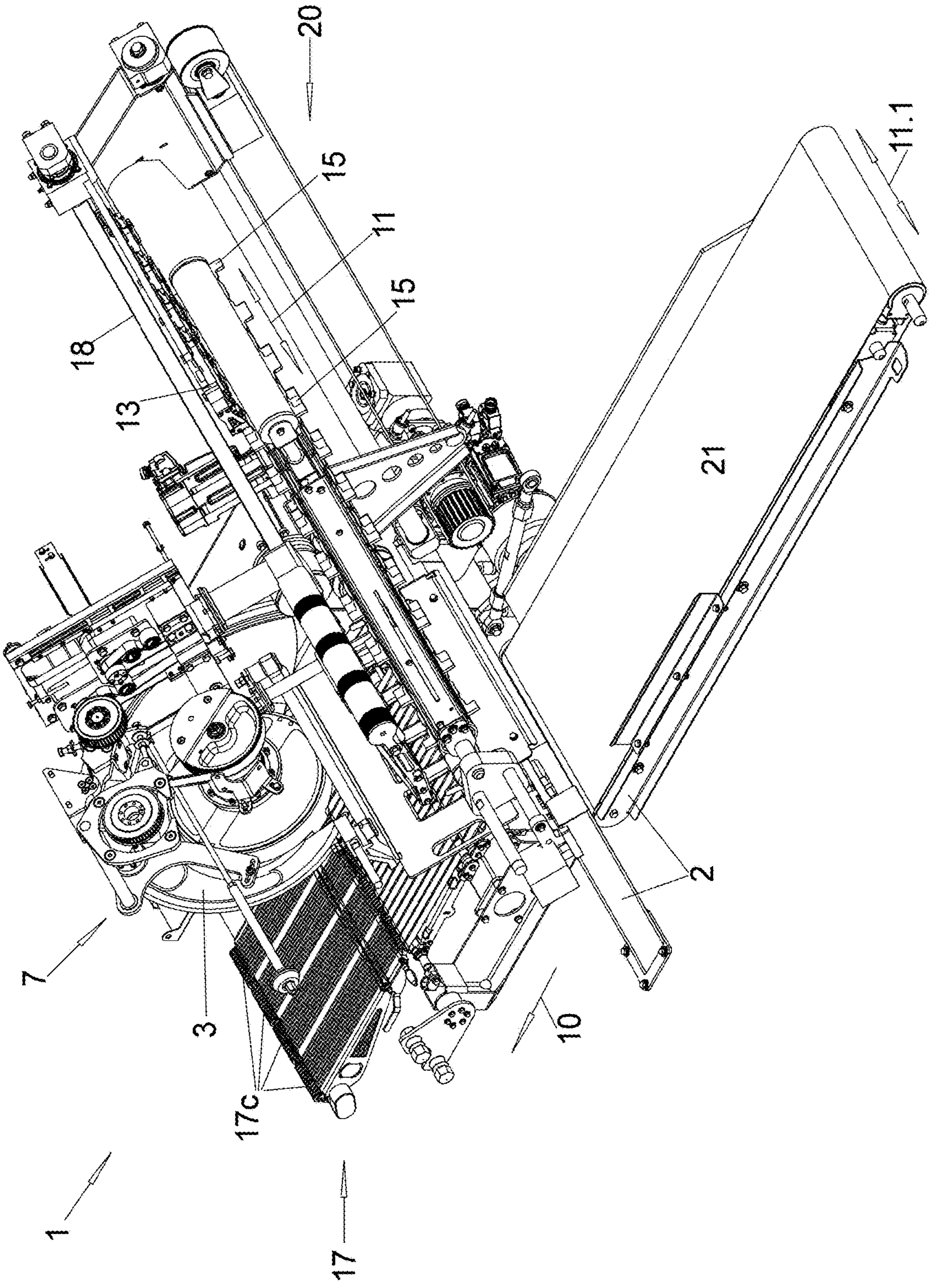

FIGS. 1A, 1B show different perspective views of a multi-track slicer 1 for simultaneously slicing a plurality of product calibers K—which are not represented for reasons of clarity—in each case on a track SP1 to SP4 next to each other, and storing them in shingled portions P each consisting of several slices S with a general direction of travel 10* through the slicer 1 from right to left.

Figure 2A:
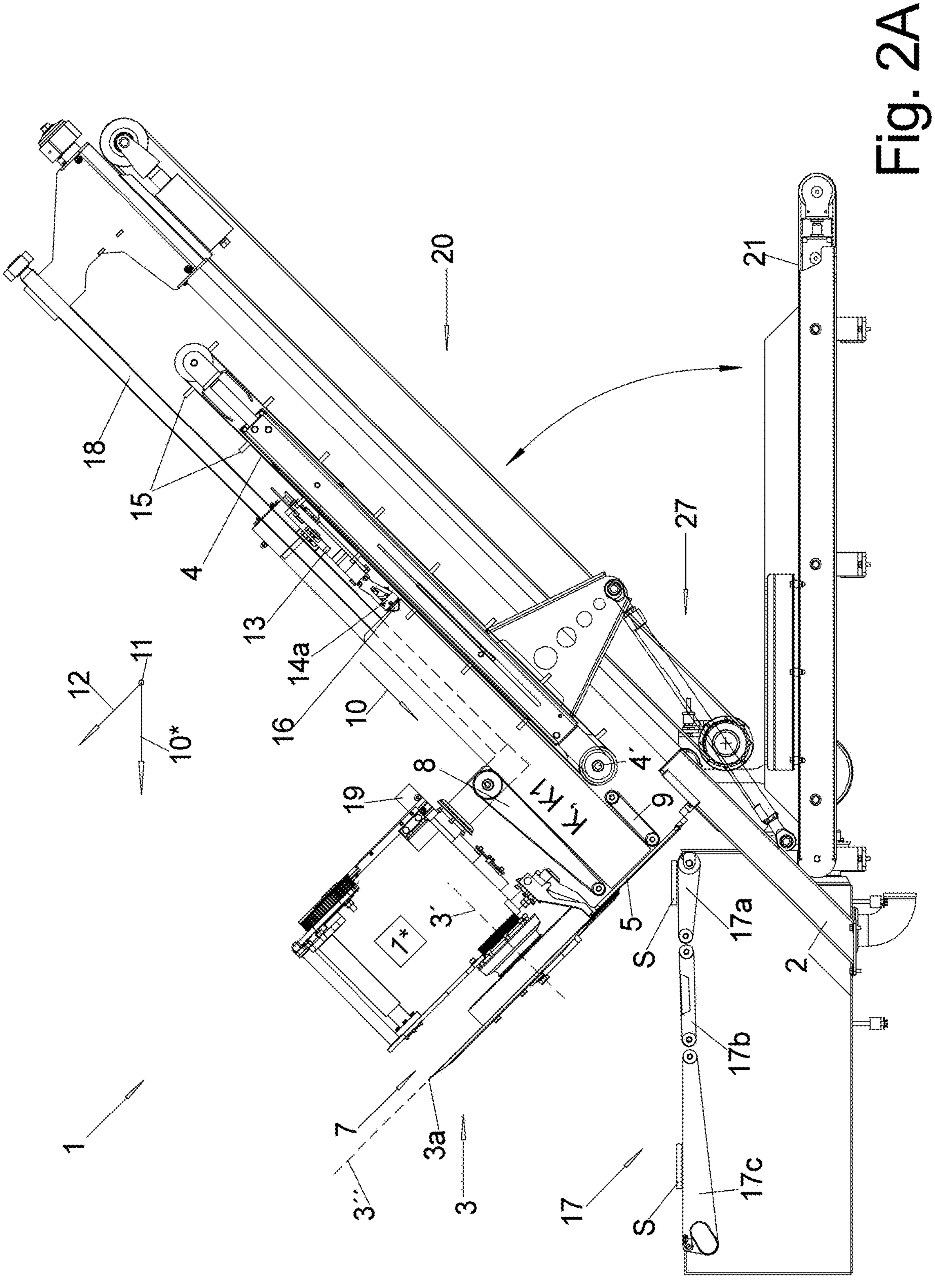
FIG. 2A shows a simplified side view of the slicing machine according to the prior art, loaded with a product caliber, which is in a first functional position.
Figure 2B:
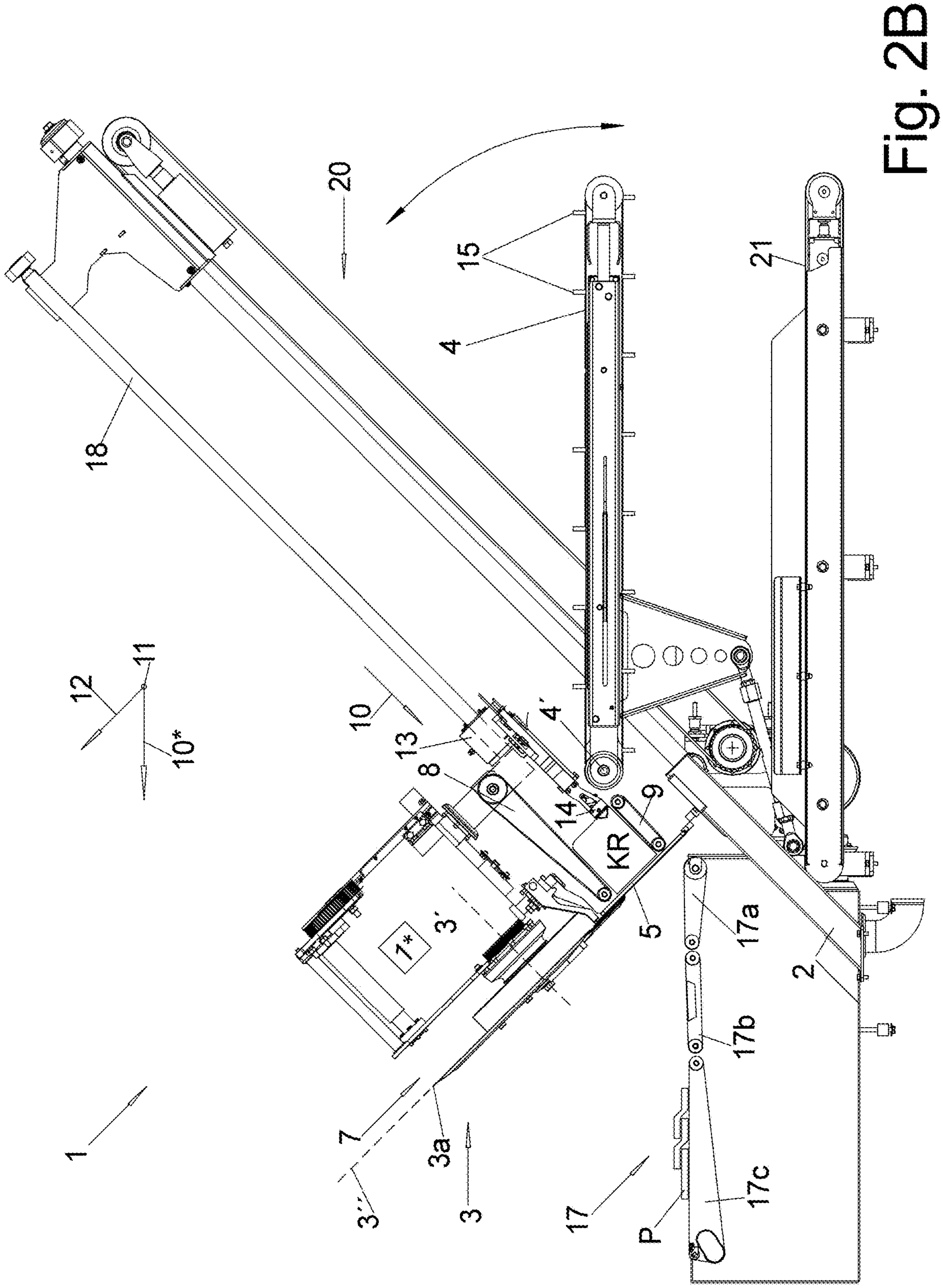
FIG. 2B shows a side view according to FIG. 2A, but with the feed belt folded down into the loading position and the product caliber sliced apart from a remnant caliber piece.

FIG. 2A and FIG. 2B show—with the caliber K inserted—a side view of this slicer 1, omitting covers and other parts not relevant to the invention, which are attached to the base frame 2 in the same manner as all other units, so that the functional parts, in particular the conveyor belts, can be seen more clearly. The longitudinal direction 10 is the feed direction of the calibers K to the slicing unit 7 and thus also the longitudinal direction of the calibers K lying in the slicer 1.

It can be seen that the basic structure of a slicer 1 according to the prior art is that a cutting unit 7 with a blade 3 rotating about axis of rotation 3', in this case a sickle knife 3, is fed with several, in this case four, product calibers K lying transversely to the feed direction 10 next to one another on a feed conveyor 4, with spacers 15 of the feed conveyor 4 between them, by this feeding unit 20, from the front ends of which the rotating blade 3 cuts off a slice S with its cutting edge 3*a* in each case in one operation, that is to say almost simultaneously.

For slicing the product calibers K, the feed conveyor 4 is in the slicing position shown in FIGS. 1A-2A, which is oblique in side view with a low-lying front end on the cutting side and a high-lying rear end, from which it can be folded down about a pivot axis 4' extending in its width direction, the first transverse direction 11, which axis is located in the vicinity of the cutting unit 7, into an approximately horizontal loading position as represented in FIG. 2B.

The rear end of each log K lying in the feeding unit 20 is held in accordance with FIG. 2A in each case by a gripper 14*a-d* by positive locking with the aid of gripper claws 16. These grippers 14*a*-14*d*, which can be activated and deactivated with regard to the position of the gripper claws 16, are fastened to a common gripper slide 13, which can be tracked along a gripper guide 18 in the feed direction 10. The gripper claws 16 are attached to the gripper 14 in a movable manner, i.e. movable between an engagement position and a release position.

In this case, both the feed of the gripper carriage 13 and of the feed conveyor 4 can be driven in a controlled manner, wherein, however, the actual feed speed of the calibers K is effected by a likewise controlled driven, so-called upper and lower, driven product guide 8, 9 in the form of circulating belts, which engage on the upper side and lower side of the calibers K to be sliced in their front end areas near the cutting unit 7.

The front ends of the calibers K are each guided through a “product opening” 6*a-d* of a plate-shaped cutting frame 5, wherein the cutting plane 3" extends directly in front of the front, obliquely downward pointing end face of the cutting frame 5, in which the blade 3 rotates with its cutting edge 3*a* and thus cuts off the protrusion of the calibers K from the cutting frame 5 as a slice S. The cutting plane 3" extends perpendicularly to the upper run of the feed conveyor 4 and/or is spanned by the two transverse directions 11, 12 to the feed direction 10.

In this case, the inner circumference of the product openings 6*a-d* serves as a counter slicing edge of the slicing edge 3*a* of the blade 3.

Since both product guides 8, 9 can be driven in a controlled manner, particularly independently of one another and/or possibly separately for each track SP1 to SP4, these determine the (continuous or clocked) feed speed of the logs K through the cutting frame 5.

The upper product guide 8 is displaceable in the second transverse direction 12 (which extends perpendicularly to the surface of the upper run of the feed conveyor 4) to adapt to the height H of the log K in this direction. Further, at least one of the product guides 8, 9 can be designed to pivot about one of its deflection rollers in order to be able to change the direction of the strand of its guide belt resting against the caliber K to a limited extent.

Below the feed conveyor unit 20 there is usually an approximately horizontally extending remnant piece conveyor 21, which starts with its front end below the cutting frame 5 and immediately below or behind the discharge unit 17 and with its upper run thereon—by means of the drive of one of the discharge conveyors 17 against the direction of travel 10*—transports falling remnants to the rear.

The slices S, which are at an angle when they are separated, fall onto a discharge unit 17 which starts below the cutting frame 5 and extends in the direction of travel 10*, which in this case consists of a plurality of discharge conveyors 17*a, b, c* arranged one behind the other with their upper runs approximately aligned in the direction of travel 10*, of which the first discharge conveyor 17*a* in the direction of travel 10* can be designed as a portioning belt 17*a* and/or one can also be designed as a weighing unit.

The slices S can arrive at the discharge unit 17 individually and at a distance from one another in the general direction of travel 10* of the products through the machine or, by appropriate control of the portioning belt 17*a* of the discharge unit 17—the movement of which, like almost all moving parts, is controlled by the controller 1*—form shingled or stacked portions P by stepwise forward movement of the portioning belt 17*a*.

FIGS. 3A to 3D show a gripper carriage 13 of a slicing machine 1 according to the invention in which each gripper 14.1-14.4 comprises an adjustment unit 28.1-28.4, by means of which the particular gripper 14.1-14.4 can be moved in an actively controlled manner by a predetermined travel path V relative to the gripper carriage 13 in the feed direction 10. With the solution according to the invention, different lengths of the product calibers K to be simultaneously sliced can be compensated by means of the adjustment unit 28.1-28.4 of the particular gripper 14.1-14.4, while the grippers 14.1-14.4 are, however, still arranged on the common gripper carriage 13.

Figure 4A:
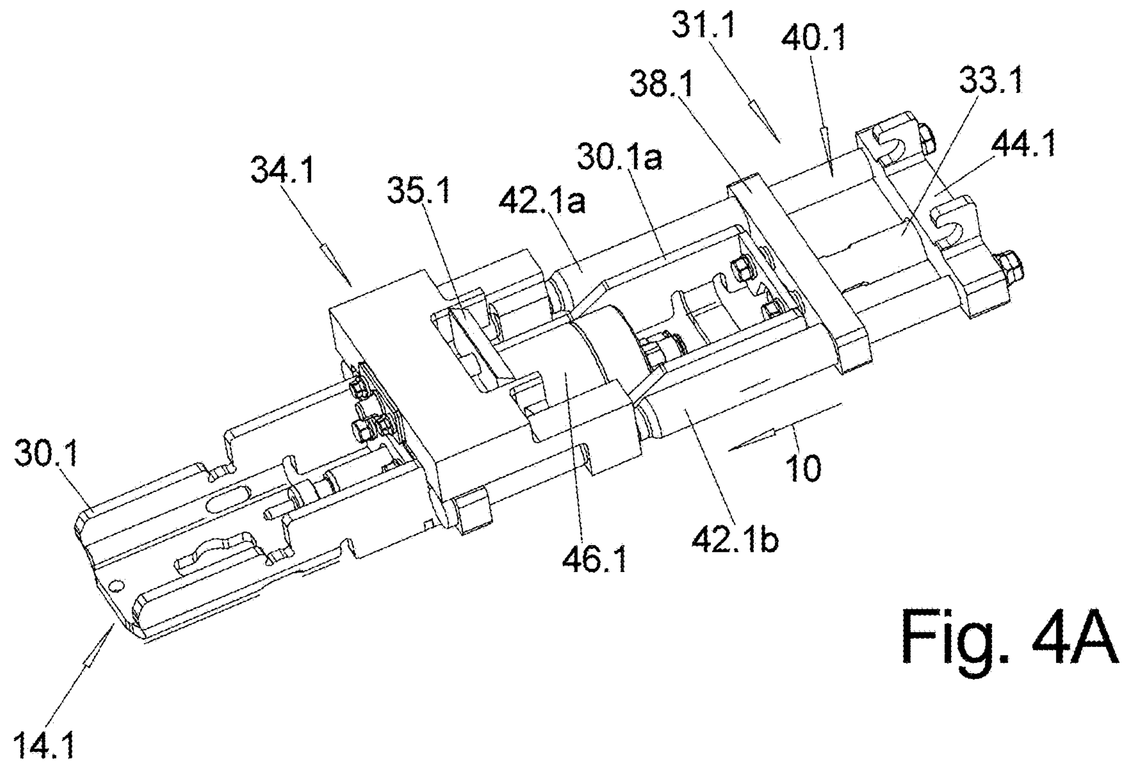
FIG. 4A shows a perspective view of an adjustment unit according to the disclosure in an extended state.
Figure 4B:
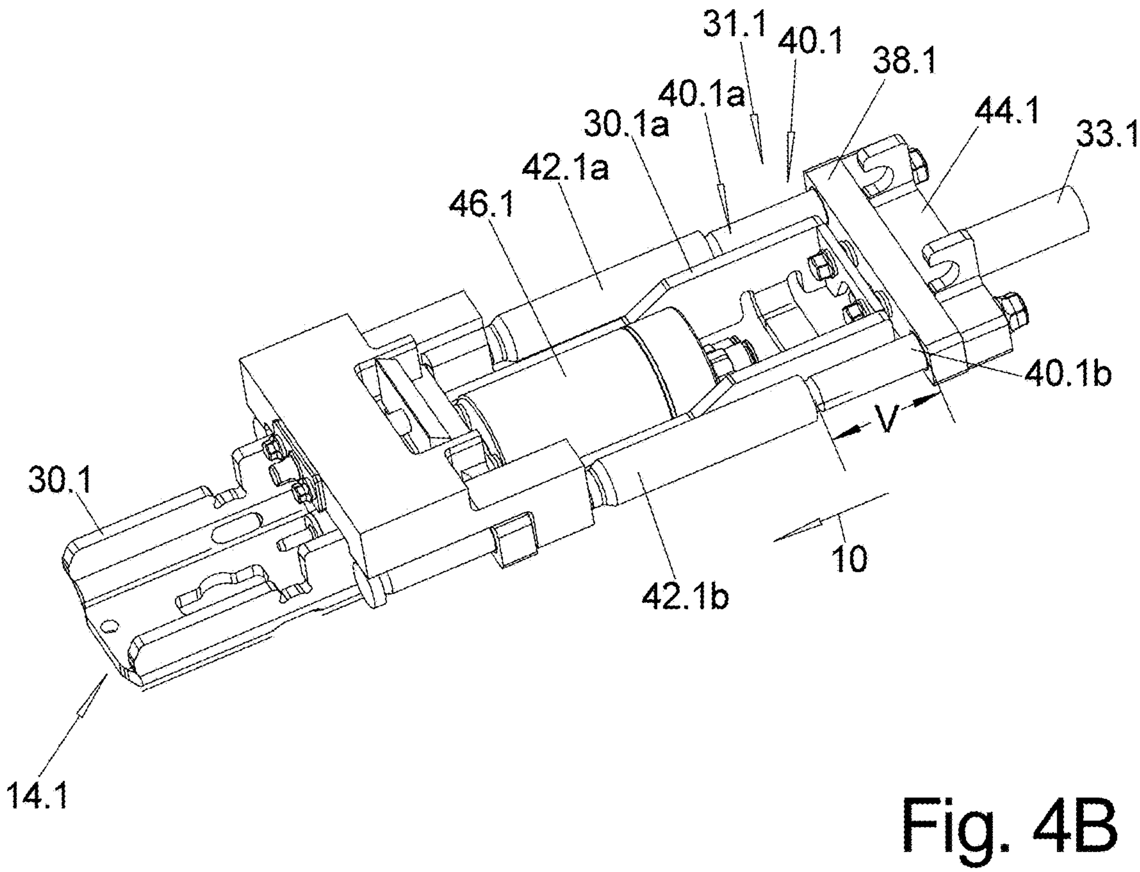
FIG. 4B shows the adjustment unit according to the invention according to FIG. 4A, but in a retracted state.
Figure 4C:
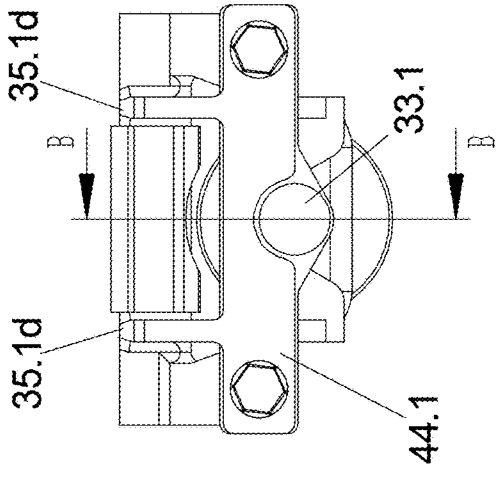
FIG. 4C shows a rear view of the adjustment unit according to FIG. 4A.
Figure 4D:
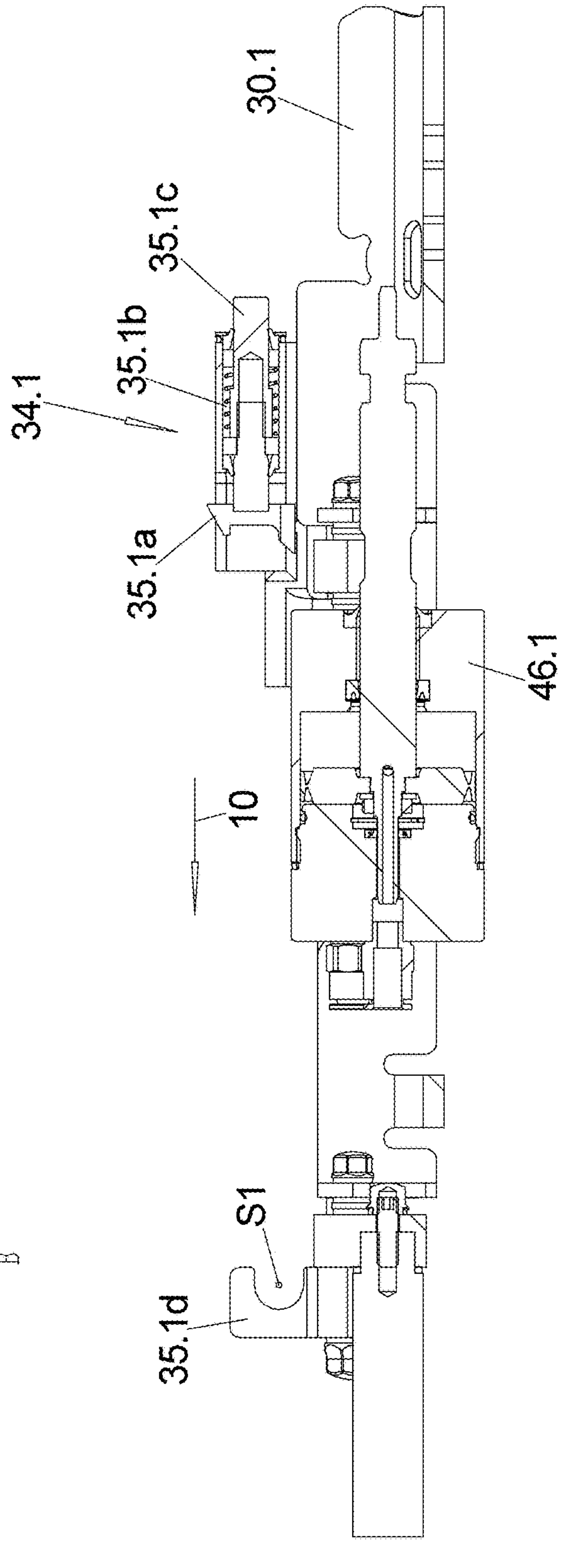
FIG. 4D shows a sectional view according to section B-B illustrated in FIG. 4C.

The predetermined travel path V, which is illustrated for example in FIG. 4B, can be at least 50 mm, preferably at least 100 mm, particularly preferably at least 150 mm, wherein the travel path V can preferably correspond to the maximum compensable length difference between a longest and a shortest of the product calibers K to be sliced.

In order to be able to move the grippers 14.1-14.4 by the travel path V in the feed direction 10, according to the illustrated embodiment, each adjustment unit 28.1-28.4 comprises a corresponding linear unit 30.1-30.4. The grippers 14.1-14.4 can each be attached to the front end of the particular linear unit 30.1-30.4 in the feed direction 10, as indicated by the reference numerals 14.1-14.4. However, the grippers 14.1-14.4 themselves are not shown in FIGS. 3A to 3D for reasons of better clarity since the grippers 14.1-14.4 per se can be designed substantially identically to those in FIGS. 1A to 2B.

Each gripper 14.1-14.4 can be moved by the predetermined travel path V relative to the gripper carriage 13 by means of the particular adjustment unit 28.1-28.4 in a force-controlled and/or position-controlled manner. In the case of force control, the grippers 14.1-14.4 can each be moved in the feed direction 10 before gripping the product caliber K to be sliced until a force acting on the particular gripper 14.1-14.4 or the particular adjustment unit 28.1-28.4 exceeds a predetermined threshold value. The force can be monitored, for example, by a corresponding sensor (not shown) formed on the adjustment unit 28.1-28.4, which is connected to the controller 1* of the slicing machine 1.

If the adjustment units 28.1-28.4 each comprise, for example, an electric, in particular servomotor drive unit 32.1-32.4, additionally or alternatively only a motor current and/or motor torque of the particular electrical drive unit 32.1-32.4 can be evaluated by means of the controller 1* in order to detect whether or not the particular gripper 14.1-14.4 has reached the product caliber assigned thereto. If the drive units 32.1-32.4, as illustrated in FIGS. 3A to 3D, are designed as pneumatic drive units, a pressure prevailing in a pneumatic cylinder and/or a path, i.e. a position, of the pneumatic cylinder of the particular drive unit 32.1-32.4 can alternatively also be monitored by means of the controller 1*. Reaching or exceeding a threshold value of the motor current, and/or motor torque, and/or the pressure, and/or the path can be defined by the controller 1* of the slicing machine 1 in such a way that the particular gripper 14.1-14.4 was moved up to the product caliber K assigned thereto.

Alternatively, however, it is also possible to first extend the grippers 14.1-14.4 completely by the predetermined travel path V in the feed direction 10 by means of the particular adjustment unit 28.1-28.4 and only then to move the grippers 14.1-14.4 together in the direction of the product calibers K by means of the gripper carriage 13, so that the grippers 14.1-14.4, and thus the adjustment units 28.1-28.4, are each moved back by a predetermined partial amount of the predetermined travel path V against the feed direction 10 by moving in the feed direction 10 against the particular product caliber K depending on the length differences of the product calibers K to be simultaneously sliced, until each gripper 14.1-14.4 can grip a product caliber K located on its track SP1-SP4.

In the illustrated embodiment, the drive units 32.1-32.4 are arranged on the side of the particular adjustment unit 28.1-28.4 facing away from the cutting unit 7. In order to be able to move the adjustment units 28.1-28.4 in the feed direction 10 by the predetermined travel path V, each of the drive units 32.1-32.4 can comprise a drive element 33.1-33.4, each of which in the illustrated embodiment is designed as a pressure rod 33.1-33.4, wherein the pressure rod 33.1 of the linear unit 30.1 can be seen as an example in FIGS. 4A and 4B. The pressure rods 33.1-33.4 can be coupled to the particular linear unit 30.1-30.4 in a manner that transmits, in particular, only pressure forces, whereby the linear units 30.1-30.4 can be moved by the predetermined travel path V in the feed direction 10 by moving the pressure rods 33.1-33.4, but preferably not opposite to the feed direction 10, since the pressure rods 33.1-33.4 only strike a particular stop plate 38.1-38.4 and can be accordingly moved back again opposite the feed direction 10 without the particular linear unit 30.1-30.4 moving back as well.

Preferably, each linear unit 30.1-30.4 of the adjustment units 28.1-28.4 comprises a linear guide 40.1-40.4, wherein however only the linear guide 40.1 is described and shown in detail below with reference to FIGS. 4A and 4B, since the linear guides 40.2-40.4 are preferably designed to be identical to the linear guide 40.1.

In the embodiment shown in FIGS. 4A and 4B, the linear guide 40.1 comprises two oppositely arranged guide rods 40.1*a* and 40.1*b*, on which the stop plate 38.1 is guided so as to be movable by the travel path V in and against the feed direction 10. The movement of the stop plate 38.1 in the feed direction 10 is limited by limiting rods 42.1*a* and 42.1*b* which have an enlarged diameter in relation to the guide rods 40.1*a* and 40.1*b*. The movement of the stop plate 38.1 against the feed direction 10 is in contrast limited by an end stop element 44.1. The stop plate 38.1 is mechanically connected, for example screwed, to a base body 30.1*a* of the linear unit 30.1 so that a movement of the stop plate 38.1 in and against the feed direction 10 leads to a corresponding movement of the base body 30.1*a* of the linear unit 30.1 and thus of the gripper 14.1. Finally, in FIGS. 4A and 4B, a gripper actuator 46.1 can be seen which is provided for actuating, i.e. for opening or closing, the gripper claws of the gripper 14.1 and can be designed, for example, as an electric or pneumatic gripper actuator 46.1.

In order to keep downtimes of the slicing machine 1 as short as possible and to be able to remove and install the adjustment units 28.1-28.4 as quickly as possible and be able to exchange them between different tracks SP1-SP4 of the slicing machine 1, each adjustment unit 28.1-28.4, in particular each linear unit 30.1-30.4 and/or each drive unit 32.1-32.4, can preferably be mounted on the particular gripper 14.1-14.4 and/or removed from the particular gripper 14.1-14.4 without tools. For this purpose, each adjustment unit 28.1-28.4 can comprise a locking system 34.1-34.4, although only the locking system 34.1 is described and shown in detail below with reference to FIGS. 3D and 4A and 4B, since the locking systems 34.2-34.4 are preferably designed to be identical to the locking system 34.1.

Figure 3A:
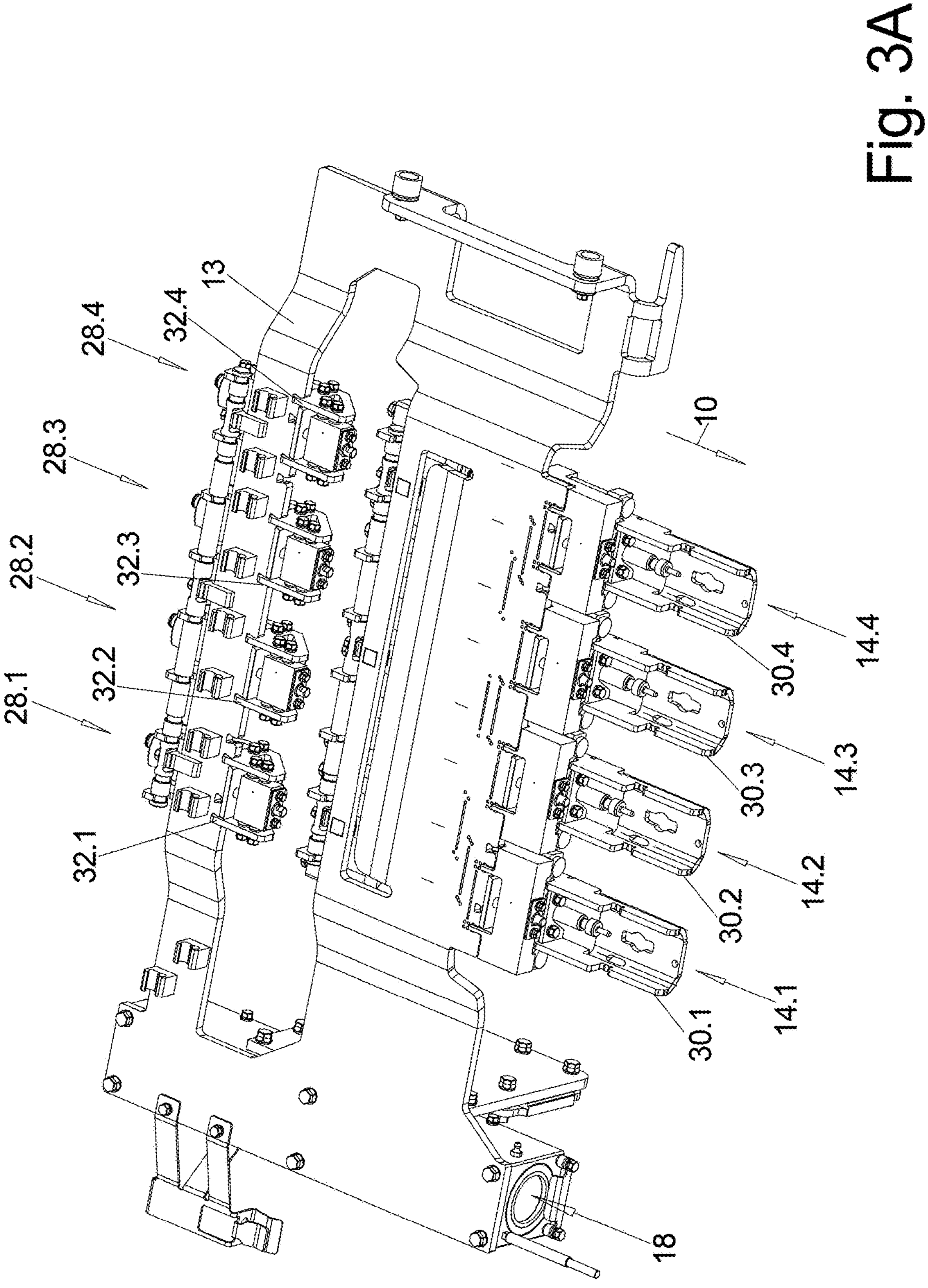
FIG. 3A shows a perspective side view of a gripper carriage of a slicing machine according to the invention with adjustment units arranged thereon.
Figure 3B:
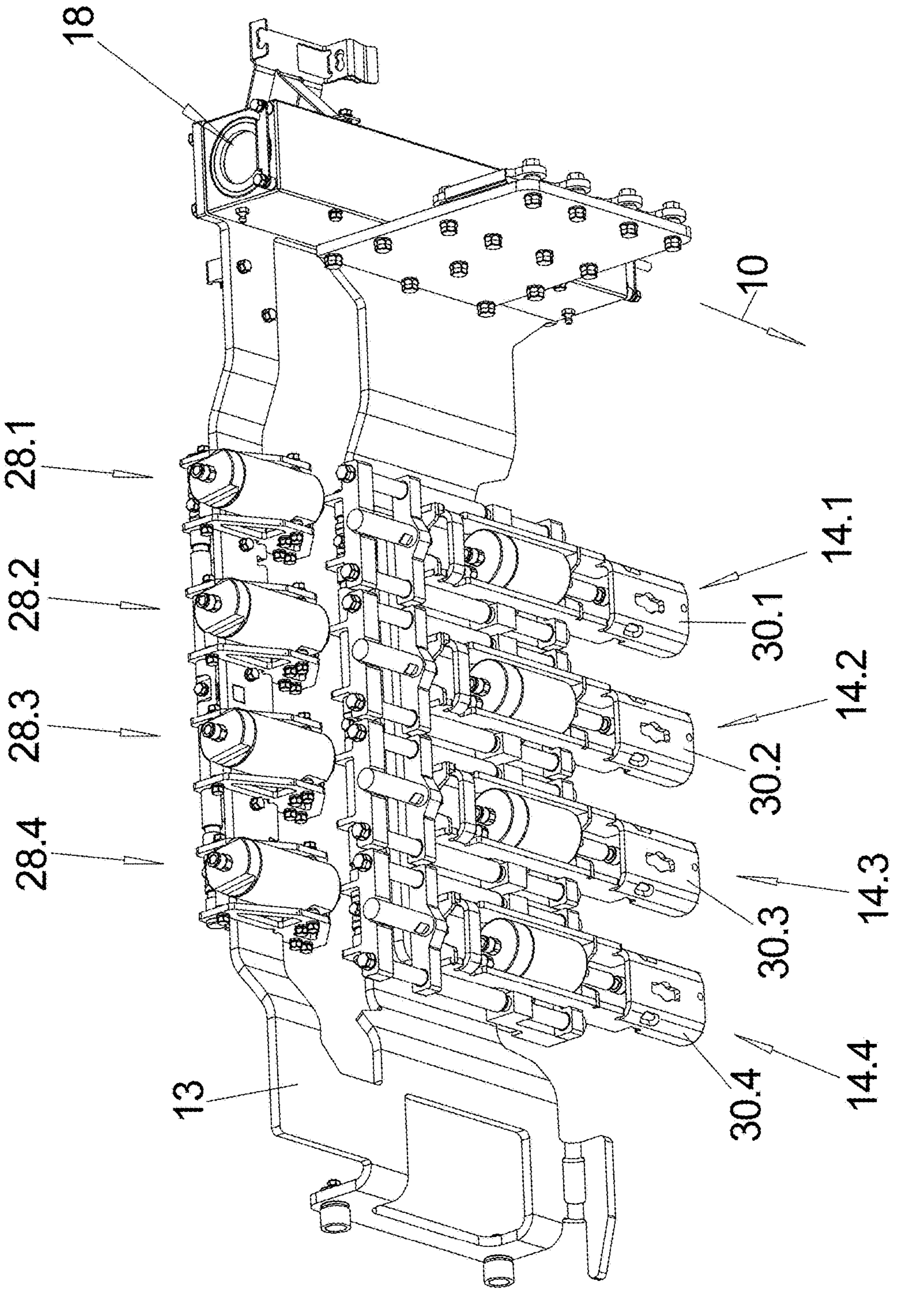
FIG. 3B shows a perspective rear view of the gripper carriage according to FIG. 3A.
Figure 3C:
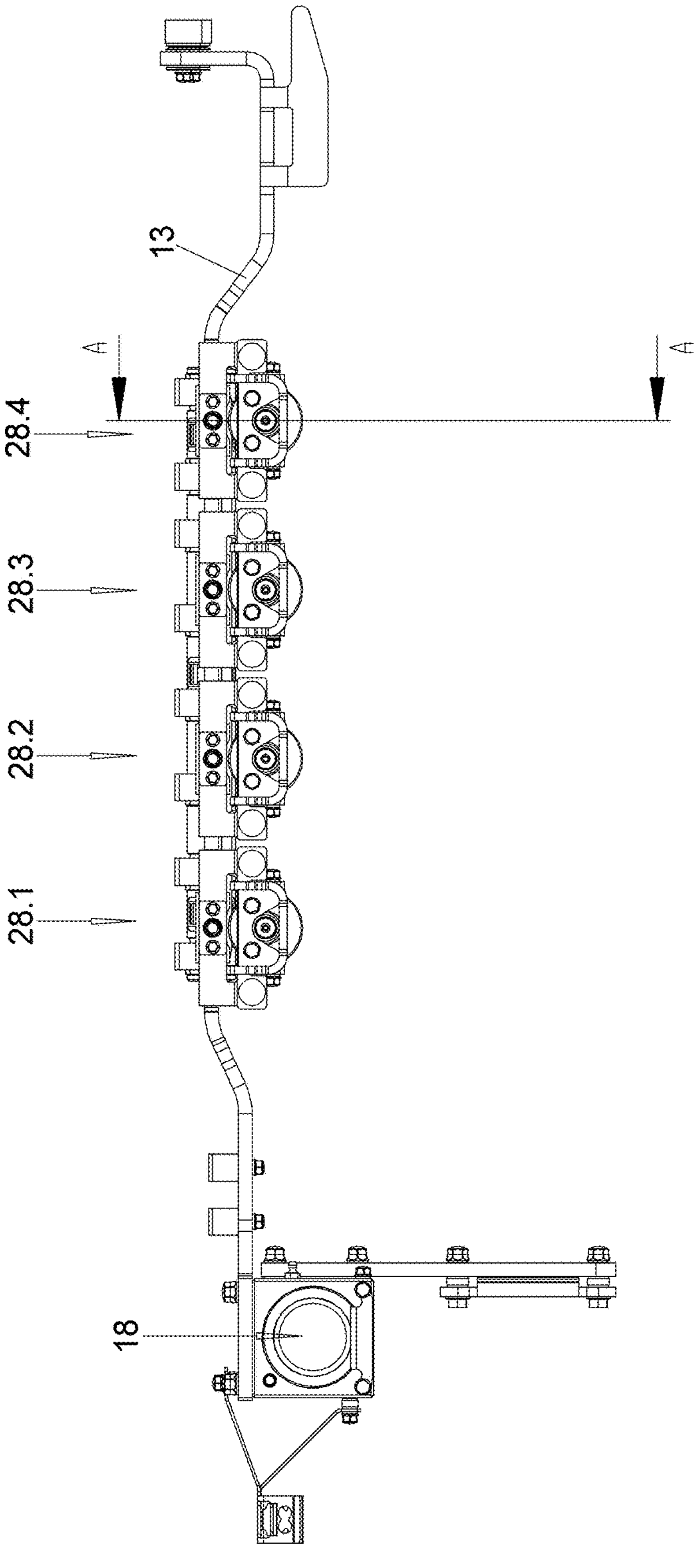
FIG. 3C shows a front view of the gripper carriage according to FIG. 3A.
Figure 3D:
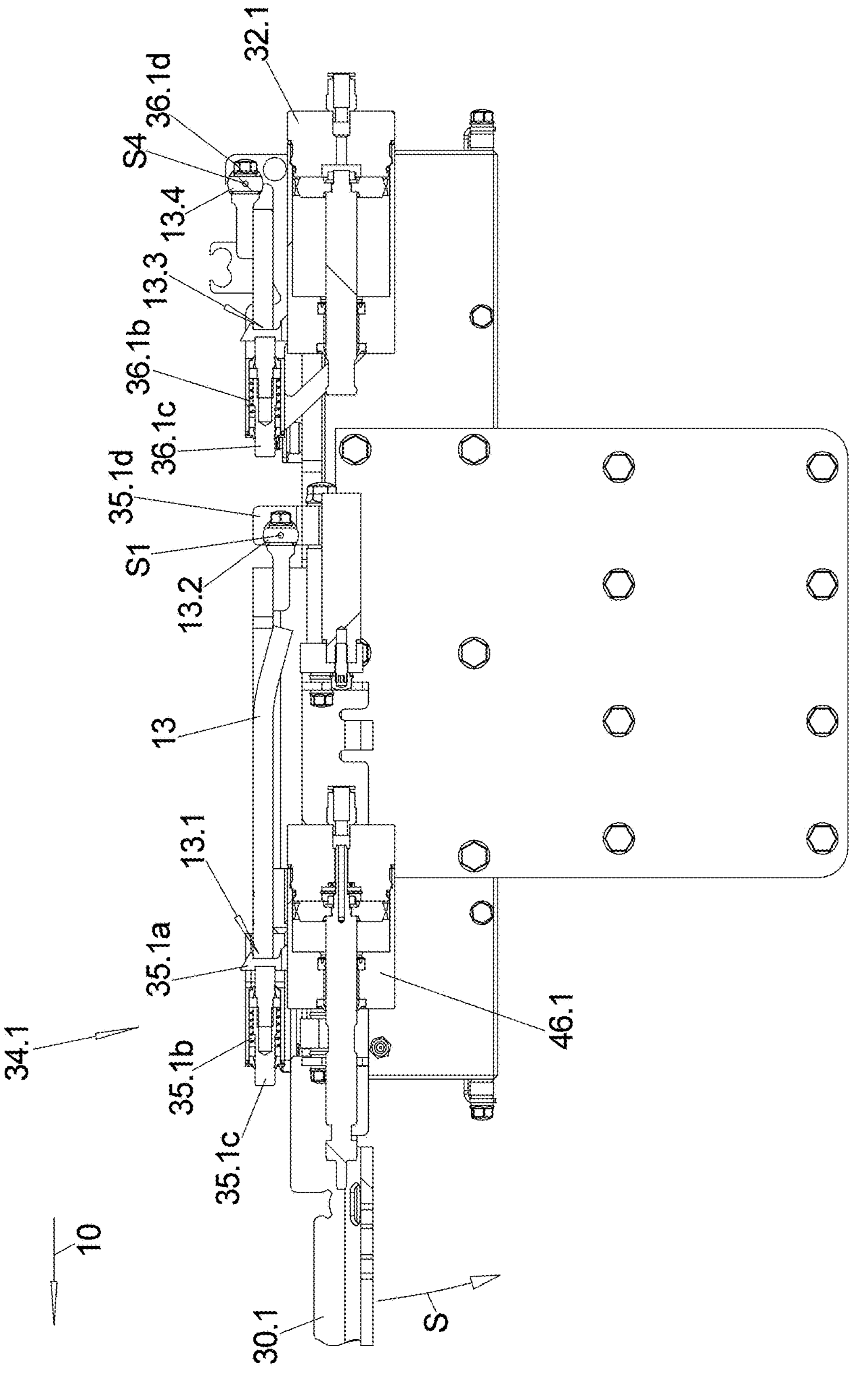
FIG. 3D shows a sectional view according to section A-A illustrated in FIG. 3C.

In the embodiment shown in FIGS. 3D and 4A to 4D, a first locking means 35.1*a* formed on the linear unit 30.1 is provided in the form of a pawl 35.1*a* which, in its locked position, is designed to engage with a second locking means 13.1, in particular a projection 13.1, arranged on the gripper carriage 13 shown in FIG. 3D. The pawl 35.1*a* is pretensioned into its locked position by means of a spring 35.1*b*. To remove the linear unit 30.1 from the gripper carriage 13, the pawl 35.1*a* can be moved from its locked position into an unlocked position by actuating an actuating element 35.1*c* in the feed direction 10 and against the spring force of the spring 35.1*b* so that the pawl 35.1*a* and the projection 13.1 are disengaged. Since the locking system 34.1 according to the illustrated embodiment further comprises a hook projection 35.1*d* formed on the linear unit 30.1, by means of which the linear unit 30.1 can be attached to a mounting portion 13.2 of the gripper carriage 13 so as to be pivotable about a pivot axis S1, the linear unit 30.1 in FIG. 3D can be pivoted downwards, as indicated by the pivot direction S, and then completely removed or unmounted from the gripper carriage 13.

The mounting of the linear unit 30.1 on the gripper carriage 13 can therefore be carried out substantially in the reverse order of the procedure described above. The linear unit 34.1 can first be hooked onto the mounting portion 13.2 of the gripper carriage 13 by means of its hook projection 35.1*d* and then pivoted upwards against the arrow direction S in FIG. 3D until the pawl 35.1*a* engages the projection 13.1 on the gripper carriage 13.

Analogously, a similar or substantially identical first locking means 36.1*a*, in particular in the form of a pawl 36.1*a*, can be provided on the drive unit 32.1, which is designed to engage in its locked position with a second locking means arranged on the gripper carriage 13, in particular in the form of a projection 13.3. The pawl 36.1*a* can also be pretensioned by means of a spring 36.1*b* into its locked position shown in FIG. 3D. The pawl 36.1*a* can be unlocked by actuating an actuating element 36.1*c* in the feed direction 10 in an analogous manner as with the pawl 35.1*a*.

Furthermore, a hook projection 36.1*d* formed on the drive unit 32.1 can be provided, by means of which the drive unit 32.1 can be attached to a mounting portion 13.4 of the gripper carriage 13 so as to be pivotable about a pivot axis S2. The drive unit 32.1 in FIG. 3D can therefore be pivoted downwards analogously to the linear unit 30.1 after unlocking the pawl 36.1*a* and can then be completely removed or unmounted from the gripper carriage 13.

Both the linear units 30.1-30.4 as well as the drive units 32.1-32.4 can have a substantially identical locking system 34.1-34.4 as described above, which further facilitates mounting or unmounting.

In order to be able to also meet the particularly high requirements with respect to hygiene in the food industry, the adjustment units 28.1-28.4, in particular the linear units 30.1-30.4, can at least partially have a profile cross section that is open at least on one side, in particular in the height direction 12 of the product caliber K, and/or can be designed substantially without undercuts. In other words, the structure of the adjustment units 28.1-28.4 can be selected such that they are particularly easily accessible for cleaning and/or are designed to be flushable so that a cleaning agent applied to the adjustment unit, such as a cleaning fluid, can drain off by itself.

Figure 5:
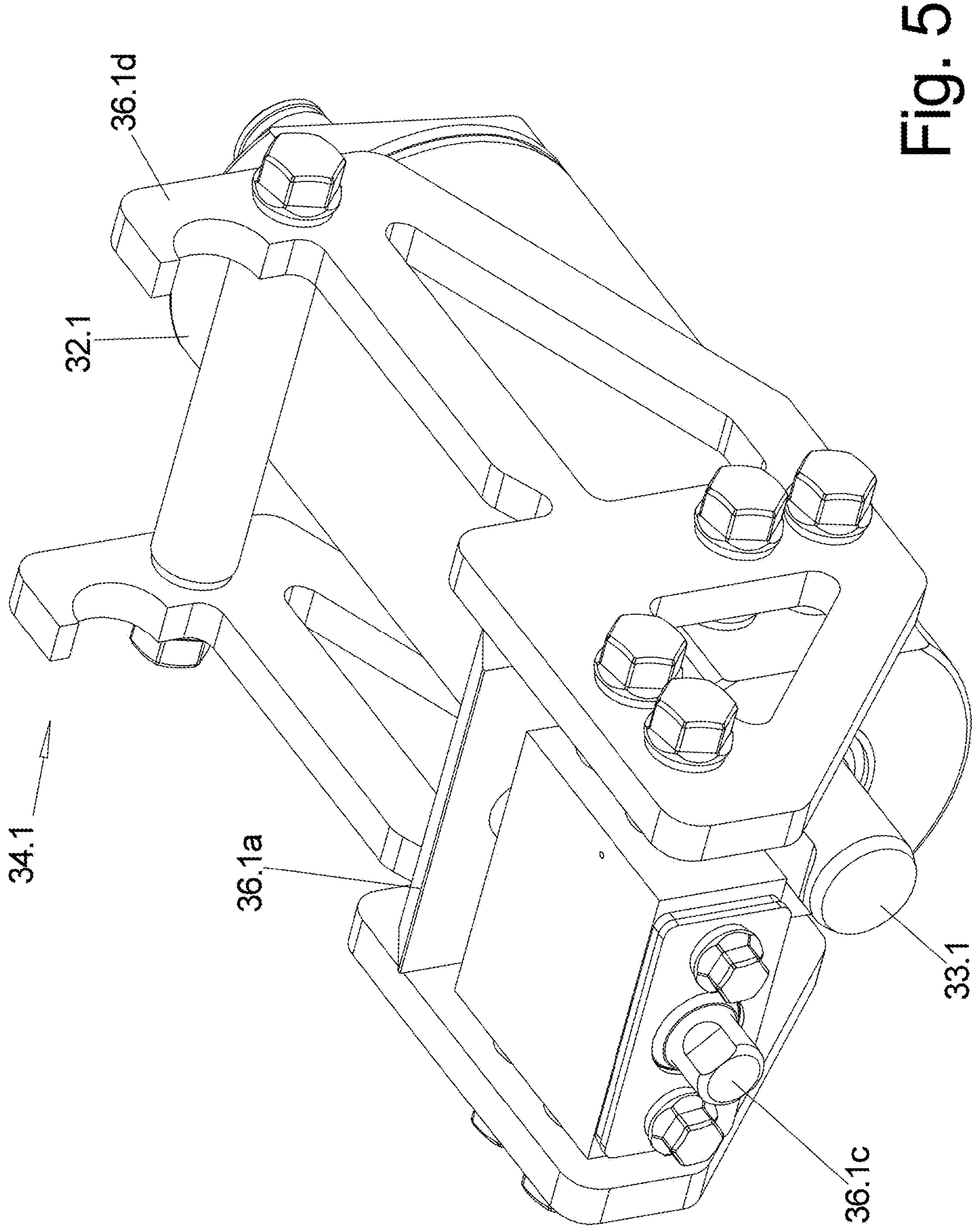
FIG. 5 shows a perspective view of a drive unit of the adjustment unit according to the invention, which is designed as a pneumatic drive unit.

Finally, FIG. 5 shows a perspective view of the drive unit 32.1 which is designed as a pneumatic drive unit 32.1. The pneumatic drive unit 32.1 can be designed as a drive unit that acts only in one direction, in particular the feed direction 10, and for this purpose can comprise, for example, a single-acting pneumatic cylinder, as can be seen for example in FIG. 3D.

LIST OF REFERENCE SIGNS

1 Slicing machine, slicer
1* Controller
2 Base frame
3 Blade
3' Axis of rotation
3" Blade plane, cutting plane
3*a* Cutting edge
4 Feed conveyor, feed belt
4' Pivot axis
5 Cutting frame
6*a-d* Goggle opening
7 Cutting unit
8 Upper product guide, upper guide belt
9 Lower product guide, lower guide belt
10 Feed direction
10* Direction of travel through machine
11 1. Transverse direction (width slicer)
12 2. Transverse direction (height-direction caliber)
12* Vertical
13 Gripper unit, gripper slide
13.1 Projection
13.2 Mounting portion
13.2 Projection
13.4 Mounting portion
14.14*a-d* Gripper
15 Spacer
15' Support surface
15" Feed plane
16 Gripper claw
17 Discharge unit
17*a, b, c* Portioning belt, discharge conveyor
18 Gripper guide
20 Feeding unit
21 Remnant piece conveyor
28.1-4 Adjustment unit
30.1-4 Linear unit
32.1-4 Drive unit, pneumatic drive unit
33.1-33.4 Drive element, pressure rod
34.1-34.4 Locking system
35.1*a* First locking means (linear unit)
35.1*b* Spring (linear unit)
35.1*c* Actuating element (linear unit)
35.1*d* Hook projection (linear unit)
36.1*a* First locking means (drive unit)
36.1*b* Spring (drive unit)
36.1*c* Actuating element (drive unit)
36.1*d* Hook projection (drive unit)
38.1 Stop plate
40.1-40.4 Linear guide
40.1*a* Guide rod
40.1*b* Guide rod
42.1*a* Limiting rod
42.1*b* Limiting rod
44.1 End stop element
46.1 Gripper actuator
K Product, product log
KR Remnant piece
S1, S2 Pivot axis
R Pivot direction
S Slice
P Portion

The invention claimed is:

1. A multi-track slicing machine for slicing product calibers lying parallel in different tracks into slices, and for creating portions from the slices, the slicing machine comprising:

a cutting unit with a blade, the blade being movable in a cutting plane for separating the slices from the product calibers, a feeding unit with a feed conveyor for feeding the product calibers to the cutting unit along a feed direction, and a gripper unit comprising a respective gripper for each of the tracks, a gripper carriage which carries the grippers, a carriage guide along which the gripper carriage is movable in a controlled manner in the feed direction, and a respective adjustment unit assigned to each of the grippers, by which each of the grippers is movable in an actively controlled manner along a respective travel path that corresponds to a respective predetermined travel path relative to the gripper carriage in and/or against the feed direction, wherein each of the adjustment units at least partially has a profile cross section that is open at least on one side, wherein each of the adjustment units comprises a linear unit by which the respective gripper is movable in a linear direction along the respective travel path that corresponds to the respective predetermined travel path, and each of the linear units comprises a linear guide, wherein each linear guide comprises two oppositely arranged guide rods, on which a respective stop plate is guidable so as to be movable along the respective predetermined travel path in and against the feed direction, wherein movement of each of the stop plates in the feed direction is limited by respective limiting rods, which have an enlarged diameter in relation to a diameter of the respective guide rods.

2. The slicing machine according to claim 1, wherein each of the predetermined travel paths is at least 50 mm.

3. The slicing machine according to claim 1, wherein each of the grippers is movable along the respective travel path corresponding to the respective predetermined travel path relative to the gripper carriage by the respective adjustment unit in a force-controlled and/or position-controlled manner.

4. The slicing machine according to claim 1, wherein each of the grippers can be moved in the actively controlled manner independently of other grippers of the grippers along the respective travel path corresponding to the respective predetermined travel path relative to the gripper carriage in the feed direction.

5. The slicing machine according to claim 1, further comprising a discharge unit with a discharge conveyor for the slices.

6. The slicing machine according to claim 1, wherein each of the adjustment units comprises a respective drive unit designed as a motorized drive unit.

7. The slicing machine according to claim 6, wherein, for each of the adjustment units, the respective drive unit is arranged on a side of the adjustment unit facing away from the cutting unit.

8. The slicing machine according to claim 6, wherein the drive unit of each of the adjustment units comprises a drive element coupled to the respective linear unit in a manner to transmit only pressure forces.

9. The slicing machine according to claim 1, wherein each of the adjustment units can be mounted on the gripper carriage and/or removed from the gripper carriage without tools.

10. The slicing machine according to claim 9, wherein each of the adjustment units comprises a locking system having a first locking means designed to engage in a locked position with a second locking means arranged on the gripper carriage.

11. The slicing machine according to claim 10, wherein, for each of the adjustment units, the first locking means is pre-tensioned into the locked position.

12. The slicing machine according to claim 10, wherein, for each of the adjustment units, the locking system further comprises a hook projection by which the adjustment unit can be attached to the gripper carriage so as to be pivotable about a pivot axis.

13. The slicing machine according to claim 12, wherein, for each of the adjustment units, the first locking means is designed to prevent a pivoting movement of the adjustment unit about the pivot axis when the first locking means is in the locked position.

14. A method for operating a multi-track slicing machine, the method comprising:

feeding at least two product calibers on different tracks in parallel along a feed direction, cutting off slices from front ends of the product calibers by a cutting unit, storing the slices for producing portions comprising one or more of the slices, wherein each of the product calibers is held during feeding at a rear end of the respective product caliber by a respective gripper of a gripper unit, and wherein before feeding the product calibers to the cutting unit, each of the grippers is moved in an actively controlled manner along a respective travel path that corresponds to a respective predetermined travel path relative to a gripper carriage of the gripper unit in and/or against the feed direction by a respective adjustment unit assigned to the gripper, so that each of the grippers can grip the rear end of the product caliber assigned thereto, wherein each of the adjustment units at least partially has a profile cross section that is open at least on one side, wherein each of the adjustment units comprises a linear unit by which the respective gripper is movable in a linear direction along the respective travel path that corresponds to the respective predetermined travel path, and each of the linear units comprises a linear guide, wherein each linear guide comprises two oppositely arranged guide rods, on which a respective stop plate is guidable so as to be movable along the respective predetermined travel path in and against the feed direction, wherein movement of each of the stop plates in the feed direction is limited by respective limiting rods, which have an enlarged diameter in relation to a diameter of the respective guide rods.

15. The method according to claim 14, wherein each of the grippers is movable in the actively controlled manner independently of other grippers of the grippers along the respective travel path corresponding to the respective predetermined travel path relative to the gripper carriage in and/or against the feed direction.

16. The method according to claim 14, wherein each of the predetermined travel paths is at least 50 mm.

17. The method according to claim 14, wherein each of the grippers is movable in a force-controlled and/or position-controlled manner along the respective travel path corresponding to the respective predetermined travel path relative to the gripper carriage.

* * * * *